C. A. MERCIER.
TAPPING MACHINE.
APPLICATION FILED NOV. 30, 1907.

909,437.

Patented Jan. 12, 1909.

2 SHEETS—SHEET 1.

WITNESSES
W. P. Burk
M. Petit

INVENTOR
Charles Arthur Mercier
ATTY.

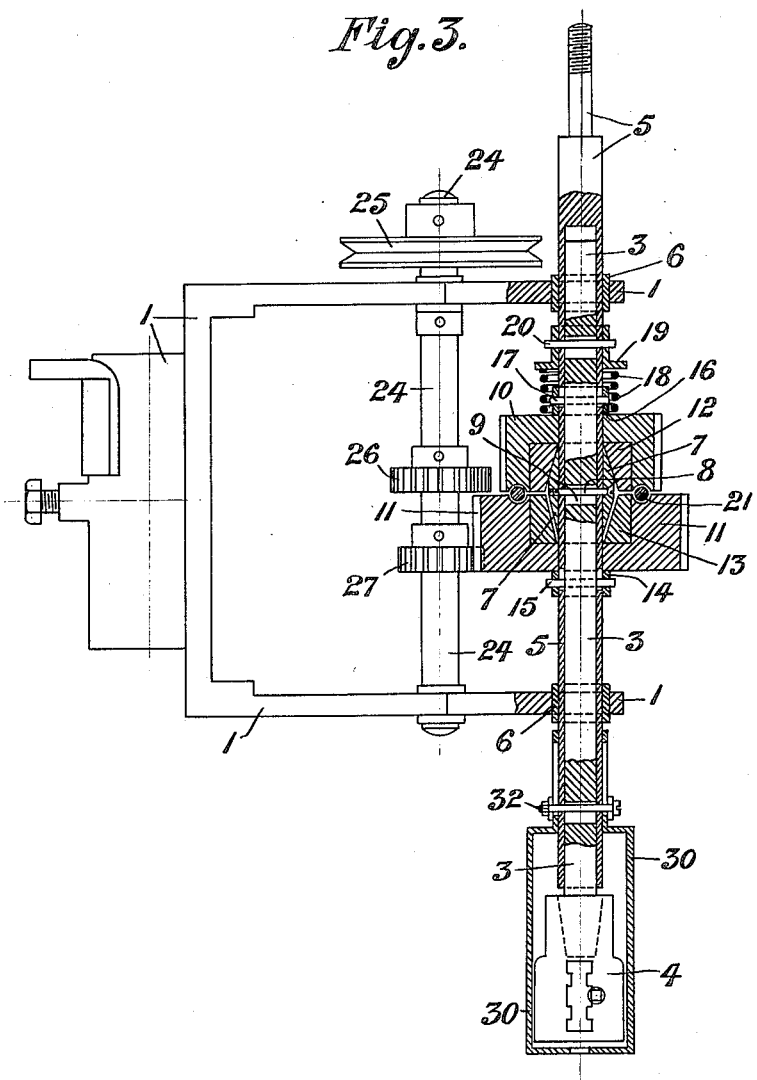

UNITED STATES PATENT OFFICE.

CHARLES ARTHUR MERCIER, OF CATFORD, ENGLAND.

TAPPING-MACHINE.

No. 909,437.      Specification of Letters Patent.      Patented Jan. 12, 1909.

Application filed November 30, 1907. Serial No. 404,548.

*To all whom it may concern:*

Be it known that I, CHARLES ARTHUR MERCIER, a subject of the King of England, residing at Catford, in the county of Kent, England, have invented new and useful Improvements in Tapping-Machines, of which the following is a specification.

This invention has reference to tapping machines, of the type which, upon the tap reaching the limit of the tapping depth desired, reverses and is withdrawn from the work, and the direction of rotation of the tap is effected first in one way and then in another through gearing and friction clutches, and it has primarily for its objects to provide improvements hereinafter described in connection with such machines, by which their efficiency or utility is increased, and they are generally improved.

The invention is illustrated in the annexed drawings, in which—

Figure 1:
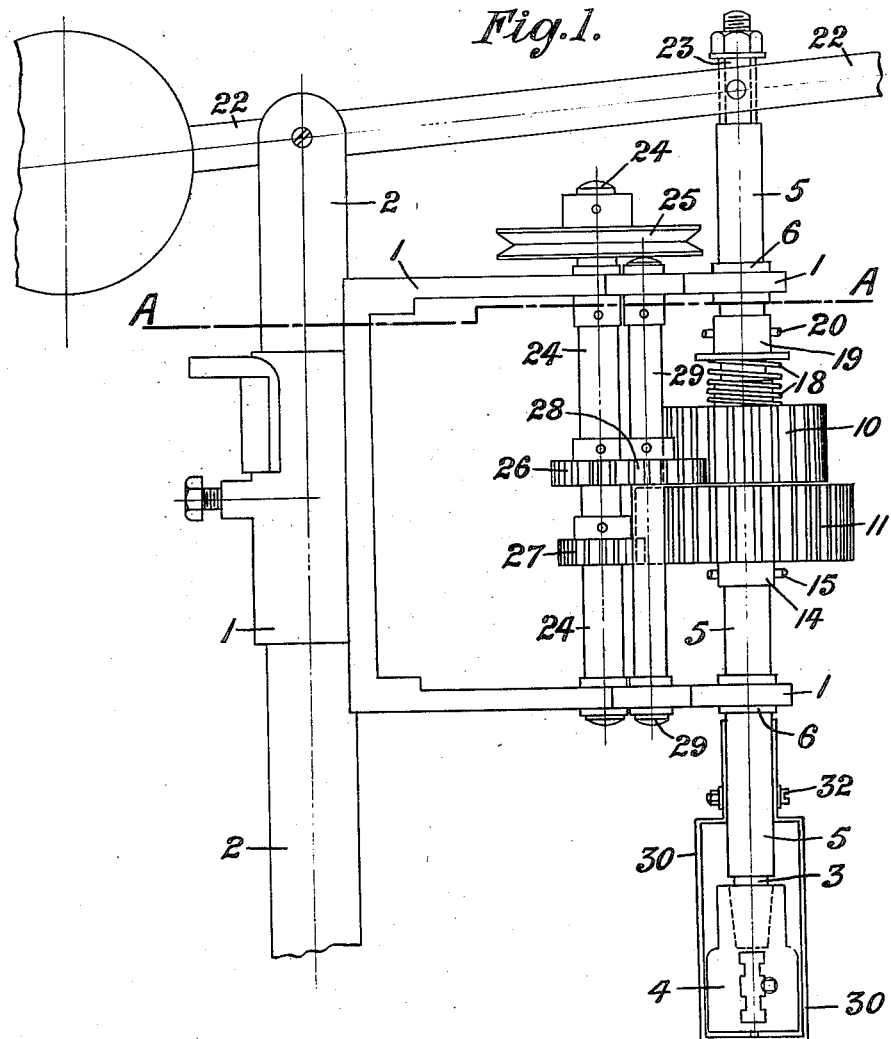
Figure 2:
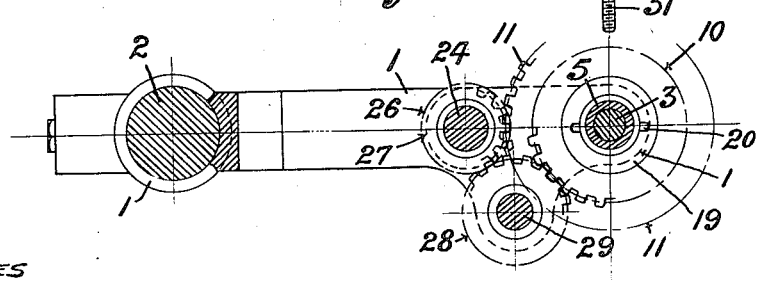

Figure 1 is a side elevation in outside view. Fig. 2 is a plan in section taken at A A Fig. 1, and Fig. 3 is an outside elevation partly in section; and the novel characteristics of which it is comprised are specified or set out in the claiming clauses concluding the specification.

In a machine involving the improvements hereunder, there are two vertical concentric spindles, an outer and an inner one, with reversing or motion transmitting friction clutches connected with same, such clutches being operated by toothed gearing; and in connection with the tap chuck on the spindle end, there is a stop gage or device.

In the drawings, 1 is the frame carrying the mechanism, and 2 the column which carries it.

3 is the inner of the concentric spindles, carrying on its lower end the tap chuck 4; and 5 is the outer of the spindles, which fits on the inner spindle.

The outer spindle 5 is carried in bearings 6 in the frame 1; and the internal surface of this spindle serves as a bearing for the inner central spindle 3.

The spindle 5 has fixed upon it an oppositely inclined cone 7, it being fixed to 5 by a pin 8, which passes through the cone and holes in the shaft 5, and also through a slotted hole 9 in the shaft 3; and in connection with this cone are two clutch toothed wheels 10 and 11, having conically faced seats 12, 13 respectively fixed in them, in connection with which the faces of the cone 7 are adapted to operate. These two clutch wheels 10, 11 are loosely mounted and revolve on the spindle 5, and are held in relation to each other vertically, through a collar 14 below 11, which is fixed to the spindle 3 by a pin 15—which also passes through slotted holes in the outer shaft 5 to allow of relative vertical movement; while the upper clutch wheel 10 is held down by a collar 16 and pin 17 passed through the internal shaft 3 similarly to 14, 15, and pressed together with the wheel 11, downwards, by a spring 18 the upper end of which is held by a flanged collar 19, fixed to the outer shaft 5 by a pin 20 passing through holes in it, and through a slotted hole in the shaft 3, which allows of relative vertical movement.

The two wheels 10, 11, are separated from one another, and work in connection with each other, through bearing balls 21 running in grooved races in the adjacent faces of the wheels.

The spindles 3 and 5 are worked up and down by, and are normally pressed upwards, and kept in their upper position by a weighted lever 22, hinged to the upper end of the supporting column or frame 2, and connected with the upper end of the spindle 5 through a sleeve 23, fitting over the spindle end, and carried in trunnions in the lever 22. Normally, therefore, while the outer spindle 5 is held by the weighted lever 22 in its upper position, the inner spindle 3 will be suspended within the spindle 5, in its lower position in relation thereto; it being supported in this position by one or more of the pins which pass through the two spindles. In this relative position of the two spindles, the upper part of the clutch cone 7 will be in contact with the interior coned surface of the clutch wheel 10; but when the machine is put into action these parts change their relative position as hereinafter described.

The spindles and the parts connected with them, are revolved through driving gearing carried in the frame 1. This comprises a spindle 24 having upon its end a driving pulley 25, and two spur pinions 26 and 27, the lower one, 27, meshing with the lower clutch toothed wheel 11, and the upper one with a pinion 28, fixed on a second spindle 29 parallel with 24, and meshing with the upper clutch toothed wheel 10. Thus, the shafts 24 and 29 will be revolved in opposite directions, and the wheel 10 will be revolved in the same direction as the spindle 24, while the clutch wheel 11 will be revolved in an opposite direction to this shaft; and hence the two wheels 10 and 11 revolve in opposite directions. If therefore the upper clutch wheel is engaged with the upper part of the cone 7, the shafts 5, 3, will be revolved in one direction, whereas if the lower half of the clutch 7 be engaged with the lower wheel 11, these shafts will be revolved in the opposite direction.

On the lower end of one of the spindles is a stop 30, which is in the form of a bridge-bar, the lower part of which is pierced, and through which the tap 31 passes; and this part of the stop device comes under the lower face of the chuck; and this stop is carried from the shaft 5 by a pin 32 passing through vertical slots 33, in its upper part, and through holes in the shaft 5, and a slotted hole through the shaft 3. By this construction so much of the tap 31 projects through the hole in its lower part as is equal to the depth of the hole in the work to be tapped.

In action, when a hole is to be tapped, the lever 22 is drawn down, so moving down the spindles 5, 3, clutch 7 and gears 10 and 11, until the tap 31 reaches the work, when, by its resistance to the tap, the spindle 3 will be held vertically, while the continued movement of the outer spindle 5—which will then slide over the spindle 3—will bring the lower half of the clutch 7 into engagement with the lower clutch wheel 11, and so will cause the external spindle 5 to revolve in the required direction and with it, through the transverse pins described, the central shaft 3 thus revolving the tap 31. In this downward movement of the spindles, the spring 18, depressing the wheels 10, 11, will be compressed. The tapping action will continue until the lower edge of the stop 30 reaches the work, whereupon the spindle 5 will be stopped in its descent, and the last portion of the downward movement of the spindle 3 will disengage the clutch wheel 11 from the lower half of clutch 7, and it ceases to rotate the spindles. That is, the tap 31 and the spindle 3 and the spur wheels 10, 11, will move down by the engagement of the tap in the work, the effect of which is to disengage the lower wheel 11 from the lower clutch, and the spindles 5, 3, cease to revolve. Now if the pressure on the lever 22 is released, the spring 18 comes into action, and forces the upper wheel conical seat 12 down onto the upper part of the clutch—the position shown. At once the spindles 5, 3, revolve in the opposite direction, and disengage the tap from the work.

It will be seen, there is a neutral position in which neither part of the cone is engaged.

It will be seen by this invention, that the feed of this machine is through the spindles, and that the stop is also on the spindles; and this offers many advantages, as it enables, among other things, the vertical arrangement of machine to be employed, which is generally very convenient, this position being generally the best for the purpose. Further, by this machine, one operating action only effects all the necessary movements.

What is claimed is:—

1. In a tapping machine a suitable supporting frame, a pair of concentric spindles mounted therein to have rotary and longitudinal movement, a connection between said spindles for causing them to rotate in unison, but permitting a limited axial movement of one with relation to the other, a tap carrying device on one of the spindles, a double cone on the other spindle, a work contact device also carried by said other spindle, a pair of wheels having internally coned surfaces for making contact with said double cone, means for rotating said pair of wheels in opposite directions, and means for moving the spindles longitudinally, substantially as described.

2. In a tapping machine, a suitable frame, a pair of concentric spindles mounted therein to have rotary and longitudinal movement, a connection between said spindles for causing them to rotate in unison but permitting a limited longitudinal movement of one in relation to the other, a tap holding device carried by one spindle, a work contact device carried by the other spindle, a double friction cone carried by the spindle which carries the contact device, a pair of friction wheels for coöperating with said double cone, means for rotating said wheels in opposite directions, a spring for keeping one friction wheel normally in engagement, and actuating means for imparting longitudinal movement to the tap carrying spindle, substantially as described.

3. In a tapping machine, a suitable frame, an outer spindle mounted therein to have rotary and longitudinal movement, a work contact device at one end of said spindle, an inner spindle within the outer, a tap holder carried by said inner spindle, a connection between said spindles for causing them to rotate in unison but permitting limited relative longitudinal movement, a double cone on the outer spindle, a pair of wheels having surfaces for coacting with the surfaces of the cone, means for rotating said wheels in opposite directions, an actuating device connected to the inner spindle, and a spring interposed between the outer spindle and one wheel for keeping them initially in engagement, substantially as described.

In testimony whereof I have signed my name to this specification in the presence of two subscribing witnesses.

CHARLES ARTHUR MERCIER.

Witnesses:
 HERON JAMES WILLIAM LAING,
 GEORGE ISAAC BRIDGES.